United States Patent
Zhou et al.

(10) Patent No.: US 9,892,427 B2
(45) Date of Patent: Feb. 13, 2018

(54) ON-DEMAND GENERATING E-BOOK CONTENT WITH ADVERTISING

(71) Applicant: Amazon Technologies, Inc., Reno, NV (US)

(72) Inventors: Hanning Zhou, Seattle, WA (US); Jian Liang, Seattle, WA (US); Sherif M. Yacoub, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 14/474,706

(22) Filed: Sep. 2, 2014

(65) Prior Publication Data

US 2014/0372186 A1    Dec. 18, 2014

Related U.S. Application Data

(63) Continuation of application No. 11/965,645, filed on Dec. 27, 2007, now Pat. No. 8,838,489.

(51) Int. Cl.
*G06Q 40/00* (2012.01)
*G06Q 30/02* (2012.01)

(52) U.S. Cl.
CPC ......... *G06Q 30/0263* (2013.01); *G06Q 30/02* (2013.01); *G06Q 30/0255* (2013.01); *G06Q 30/0269* (2013.01)

(58) Field of Classification Search
CPC ..................................................... G06Q 40/00
USPC .......................................................... 705/35
See application file for complete search history.

(56) References Cited

U.S. PATENT DOCUMENTS

| | | |
|---|---|---|
| 5,497,236 A | 3/1996 | Wolff et al. |
| 5,594,814 A | 1/1997 | Fast et al. |
| 5,680,478 A | 10/1997 | Wang et al. |
| 5,731,884 A | 3/1998 | Inoue |
| 5,774,579 A | 6/1998 | Wang et al. |
| 5,848,184 A | 12/1998 | Taylor et al. |
| 5,901,253 A | 5/1999 | Tretter |
| 6,031,612 A | 2/2000 | Shirley |

(Continued)

FOREIGN PATENT DOCUMENTS

| | | |
|---|---|---|
| DE | 4311172 | 10/1993 |
| WO | WO2007065087 | 6/2007 |

OTHER PUBLICATIONS

Cinque, L. et al., "Segmentation of Page Images Having Artifacts of Photocopying and Scanning," Pattern Recognition Society, May 2002, 11 pages, Elsevier Science Ltd., Great Britain.

(Continued)

*Primary Examiner* — Kirsten Apple
(74) *Attorney, Agent, or Firm* — Thomas | Horstemeyer, LLP

(57) ABSTRACT

A method of providing fixed computer-displayable content in response to a consumer request for content is presented. Upon obtaining a digital image corresponding to the requested content, an advertisement is selected. The advertisement is to be included in an on-demand electronic content corresponding to the requested content. The advertisement is included with the digital image corresponding to the requested content. A fixed computer-displayable content corresponding to the requested content is generated. The fixed computer-displayable content is then provided to the consumer.

20 Claims, 8 Drawing Sheets

(56) References Cited

U.S. PATENT DOCUMENTS

| | | | |
|---|---|---|---|
| 6,072,917 | A | 6/2000 | Mori et al. |
| 6,115,497 | A | 9/2000 | Vaezi et al. |
| 6,400,845 | B1 | 6/2002 | Volino |
| 6,470,096 | B2 | 10/2002 | Davies et al. |
| 6,507,670 | B1 | 1/2003 | Moed |
| 6,954,290 | B1 | 10/2005 | Braudaway et al. |
| 6,965,440 | B1 | 11/2005 | Nakagiri et al. |
| 6,976,223 | B1 | 12/2005 | Nitschke |
| 6,993,185 | B2 | 1/2006 | Guo et al. |
| 7,016,536 | B1 | 3/2006 | Ling et al. |
| 7,031,519 | B2 | 4/2006 | Elmenhurst |
| 7,031,543 | B2 | 4/2006 | Cheng et al. |
| 7,072,527 | B1 | 7/2006 | Nako |
| 7,145,699 | B2 | 12/2006 | Dolan |
| 7,337,399 | B2 | 2/2008 | Jensen et al. |
| 7,359,944 | B2* | 4/2008 | An .......... G06Q 30/02 705/14.41 |
| 7,505,632 | B2 | 3/2009 | Hu et al. |
| 7,529,407 | B2 | 5/2009 | Marquering et al. |
| 7,557,963 | B2 | 7/2009 | Bhattacharjya |
| 7,593,595 | B2 | 9/2009 | Heaney, Jr. et al. |
| 7,668,404 | B2 | 2/2010 | Adams et al. |
| 7,714,895 | B2 | 5/2010 | Pretlove et al. |
| 7,773,803 | B2 | 8/2010 | Fan |
| 8,098,390 | B1 | 1/2012 | Yacoub et al. |
| 2001/0007980 | A1* | 7/2001 | Ishibashi .......... G06F 1/1626 705/14.4 |
| 2002/0091584 | A1 | 7/2002 | Clark et al. |
| 2002/0107759 | A1* | 8/2002 | An .......... G06Q 30/02 709/206 |
| 2002/0118889 | A1 | 8/2002 | Shimizu |
| 2002/0188532 | A1* | 12/2002 | Rothstein .......... G06Q 30/02 705/29 |
| 2003/0072031 | A1 | 4/2003 | Kuwata et al. |
| 2003/0118234 | A1 | 6/2003 | Tanaka et al. |
| 2003/0202696 | A1 | 10/2003 | Simard |
| 2005/0093865 | A1 | 5/2005 | Jia |
| 2005/0129325 | A1 | 6/2005 | Wu |
| 2005/0163374 | A1 | 7/2005 | Ferman et al. |
| 2005/0180631 | A1 | 8/2005 | Zhang et al. |
| 2005/0244060 | A1 | 11/2005 | Nagarajan et al. |
| 2005/0264527 | A1 | 12/2005 | Lin |
| 2006/0126093 | A1 | 6/2006 | Fedorovskaya et al. |
| 2007/0025612 | A1 | 2/2007 | Iwasaki et al. |
| 2007/0067267 | A1 | 3/2007 | Ives |
| 2007/0074108 | A1 | 3/2007 | Xie et al. |
| 2007/0076261 | A1 | 4/2007 | Ito |
| 2007/0233562 | A1* | 10/2007 | Lidwell .......... G06Q 30/02 705/14.66 |
| 2008/0144925 | A1 | 6/2008 | Zhu et al. |
| 2008/0246975 | A1 | 10/2008 | Poxon et al. |
| 2008/0249870 | A1 | 10/2008 | Angell et al. |
| 2009/0022397 | A1 | 1/2009 | Nicholson |
| 2009/0051497 | A1 | 2/2009 | Miyaso |
| 2009/0086275 | A1 | 4/2009 | Liang et al. |
| 2009/0089107 | A1 | 4/2009 | Angell et al. |
| 2009/0115915 | A1 | 5/2009 | Steinberg et al. |
| 2009/0157502 | A1* | 6/2009 | Cooper .......... G06Q 30/02 705/14.36 |
| 2009/0216623 | A1* | 8/2009 | Hendricks .......... G06Q 30/02 705/14.4 |

OTHER PUBLICATIONS

Le Bourgeois, F. et al., "Document Images Analysis Solutions for Digital Libraries," International Workshop on Document Image Analysis for Libraries, Jan. 2004, 23 pages, IEEE, USA.

Baird, H.S., "Difficult and Urgent Open Problems in Document Image Analysis for Libraries," International Workshop on Document Image Analysis for Libraries, Jan. 2004, 8 pages, IEEE, USA.

Fan, J. et al., "A Comprehensive Image Processing Suite for Book Re-mastering," International Conference on Document Analysis and Recognition, Aug. 2005, 5 pages, IEEE, USA.

Cannon, et al. "Quality Assessment and Restoration of Typewritten Document Images." International Journal on Document Analysis and Recognition. 2. (1999): 80-89.

Walessa, et al. "Model-Based Despeckling and Information Extraction from SAR Images." IEEE Transactions on Geoscience and Remote Sensing. 38.5 (2000): 2258-2269.

Aiazzi, et al. "Multiresolution Adaptive Speckle Filtering: a Comparison of Algorithms." Geoscience and Remote Sensing, 1997. IFARSS '97. Remote Sensing—A Scientific Vision for Sustainable Development., 1997 IEEE International. 2. (1 057-1 056):1997.

Yin, et al. "Multi-component Document Image Coding Using Regions-of-Interest" Springer Lecture Notes in Computer Science—DAS 2004.3163. (2004): 158-169.

Silva et al. "Background Removal of Documents Images Acquired Using Portable Digital Cameras." Lecture Notes in Computer Science, ICIAR 2005. 3656. (2005): 278-285.

European Search Report for Application No. EP08252547 dated Apr. 27, 2009.

Mishkoff, Hank, "xBook Demo", published on the Internet at http://www.WebFeats.com/xBook. Retrieved on Feb. 18, 2011.

Wikipedia, search on "Metadata" printed May 20, 2011.

U.S. Appl. No. 11/965,645, filed Dec. 27, 2007, Notice of Allowance dated May 16, 2014.

U.S. Appl. No. 11/965,645, filed Dec. 27, 2007, Response to Final Office Action dated Jun. 3, 2011.

U.S. Appl. No. 11/965,645, filed Dec. 27, 2007, Final Office Action dated Jun. 3, 2011.

U.S. Appl. No. 11/965,645, filed Dec. 27, 2007, Response to Non-Final Office Action dated Nov. 26, 2010.

U.S. Appl. No. 11/965,645, filed Dec. 27, 2007, Non-Final Office Action dated Nov. 26, 2010.

U.S. Appl. No. 11/965,636, filed Dec. 27, 2007, Final Office Action dated Dec. 2, 2015.

U.S. Appl. No. 11/965,636, filed Dec. 27, 2007, Response to Non-Final Office Action dated Apr. 23, 2015.

U.S. Appl. No. 11/965,636, filed Dec. 27, 2007, Non-Final Office Action dated Apr. 23, 2015.

U.S. Appl. No. 11/965,636, filed Dec. 27, 2007, Advisory Action dated Jun. 17, 2011.

U.S. Appl. No. 11/965,636, filed Dec. 27, 2007, Response to Final Office Action dated Mar. 25, 2011.

U.S. Appl. No. 11/965,636, filed Dec. 27, 2007, Final Office Action dated Mar. 25, 2011.

U.S. Appl. No. 11/965,636, filed Dec. 27, 2007, Response to Non-Final Office Action dated Sep. 14, 2010.

U.S. Appl. No. 11/965,636, filed Dec. 27, 2007, Non-Final Office Action dated Sep. 14, 2010.

U.S. Appl. No. 11/864,208, filed Sep. 28, 2007, Final Office Action dated Jul. 13, 2012.

U.S. Appl. No. 11/864,208, filed Sep. 28, 2007, Response to Non-Final Office Action dated Feb. 28, 2012.

U.S. Appl. No. 11/864,208, filed Sep. 28, 2007, Non-Final Office Action dated Feb. 28, 2012.

U.S. Appl. No. 11/864,208, filed Sep. 28, 2007, Advisory Action dated Aug. 2, 2011.

U.S. Appl. No. 11/864,208, filed Sep. 28, 2007, Response to Final Office Action dated May 6, 2011.

U.S. Appl. No. 11/864,208, filed Sep. 28, 2007, Final Office Action dated May 6, 2011.

U.S. Appl. No. 11/864,208, filed Sep. 28, 2007, Response to Non-Final Office Action dated Jan. 12, 2011.

U.S. Appl. No. 11/864,208, filed Sep. 28, 2007, Non-Final Office Action dated Jan. 12, 2011.

U.S. Appl. No. 11/864,208, filed Sep. 28, 2007, Response to Non-Final Office Action dated Aug. 24, 2010.

U.S. Appl. No. 11/864,208, filed Sep. 28, 2007, Non-Final Office Action dated Aug. 24, 2010.

U.S. Appl. No. 11/864,187, filed Sep. 28, 2007, Notice of Allowance dated Aug. 30, 2013.

U.S. Appl. No. 11/864,187, filed Sep. 28, 2007, Final Office Action dated Sep. 7, 2012.

U.S. Appl. No. 11/864,187, filed Sep. 28, 2007, Response to Non-Final Office Action dated Apr. 30, 2012.

(56) References Cited

OTHER PUBLICATIONS

U.S. Appl. No. 11/864,187, filed Sep. 28, 2007, Non-Final Office Action dated Apr. 30, 2012.
U.S. Appl. No. 11/864,187, filed Sep. 28, 2007, Response to Final Office Action dated Sep. 23, 2011.
U.S. Appl. No. 11/864,187, filed Sep. 28, 2007, Final Office Action dated Sep. 23, 2011.
U.S. Appl. No. 11/864,187, filed Sep. 28, 2007, Response to Non-Final Office Action dated Feb. 22, 2011.
U.S. Appl. No. 11/864,187, filed Sep. 28, 2007, Non-Final Office Action dated Feb. 22, 2011.
U.S. Appl. No. 11/864,180, filed Sep. 28, 2007, Notice of Allowance dated Mar. 24, 2014.
U.S. Appl. No. 11/864,180, filed Sep. 28, 2007, Response to Non-Final Office Action dated Jul. 19, 2013.
U.S. Appl. No. 11/864,180, filed Sep. 28, 2007, Non-Final Office Action dated Jul. 19, 2013.
U.S. Appl. No. 11/864,180, filed Sep. 28, 2007, Response to Final Office Action dated Oct. 27, 2011.
U.S. Appl. No. 11/864,180, filed Sep. 28, 2007, Final Office Action dated Oct. 27, 2011.
U.S. Appl. No. 11/864,180, filed Sep. 28, 2007, Response to Final Office Action dated May 6, 2011.
U.S. Appl. No. 11/864,180, filed Sep. 28, 2007, Final Office Action dated May 6, 2011.
U.S. Appl. No. 11/864,180, filed Sep. 28, 2007, Response to Non-Final Office Action dated Nov. 10, 2010.
U.S. Appl. No. 11/864,180, filed Sep. 28, 2007, Non-Final Office Action dated Nov. 10, 2010.

\* cited by examiner

ON-DEMAND GENERATING E-BOOK CONTENT WITH ADVERTISING

CROSS-REFERENCE TO RELATED APPLICATIONS

This application is a continuation of and claims the benefit of U.S. patent application Ser. No. 11/965,645, entitled "ON-DEMAND GENERATING E-BOOK CONTENT WITH ADVERTISING," and filed Dec. 27, 2007, which is hereby incorporated by reference in its entirety.

BACKGROUND

The publishing industry has greatly benefited from the many advances in digital imaging and printing technologies. Indeed, one of the many advances has been the creation of an on-demand printing market where a publisher prints quantities of a book or other publication at the time that the orders are made. This is especially advantageous where requests for the publication are sporadic or limited, such that generating a typical print run would not be cost effective. Moreover, on demand printing proves advantageous when the publisher is not the originator of the publication and has only a printed copy of the publication, since the publisher can scan the pages of the publication, and generate a document therefrom.

While on-demand printing provides access to a wide variety of content, including out-of-print and/or rare documents, the content is fixed and, therefore, has not been adapted to modern marketing. In contrast, many Internet sites publish content are able to do so profitability by displaying advertisements with the published content. Indeed, most content providers that host "free" Internet sites are typically supported by advertisements. Of course, in regard to out-of-print or rare books, they typically do not include advertisements and, if they do, the advertisements are out of date and inapplicable. However, as disclosed below, as part of printing documents in an on-demand fashion, the on-demand printed content provides the opportunity to incorporate advertisements, as well as other subject matter, in an on-demand printed document.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Methods and systems for incorporating advertisements and/or subject matter not part of requested content into an on-demand instance of the requested content, is disclosed. To this end, reference is first made to the overall process for incorporating advertisements and/or other subject matter into on-demand printed content. With regard to advertisements, supplemental content, cross-referenced content, and the like may be collectively and/or alternatively incorporated into an on-demand printed document. However, for the sake of simplicity in the following description, reference will be made only to incorporating advertisements in an on-demand printing process. Nevertheless, it should be appreciated that this is solely for convenience and clarity of the description and should not be construed as limiting upon the disclosed subject matter, and particularly should not be construed as limiting the disclosed subject matter to incorporating only advertisements within an on-demand printed document. Generally speaking, advertisements and/or other content that may be incorporated within an on-demand printed document correspond to subject matter that is not part of the requested, source content.

Figure 1:
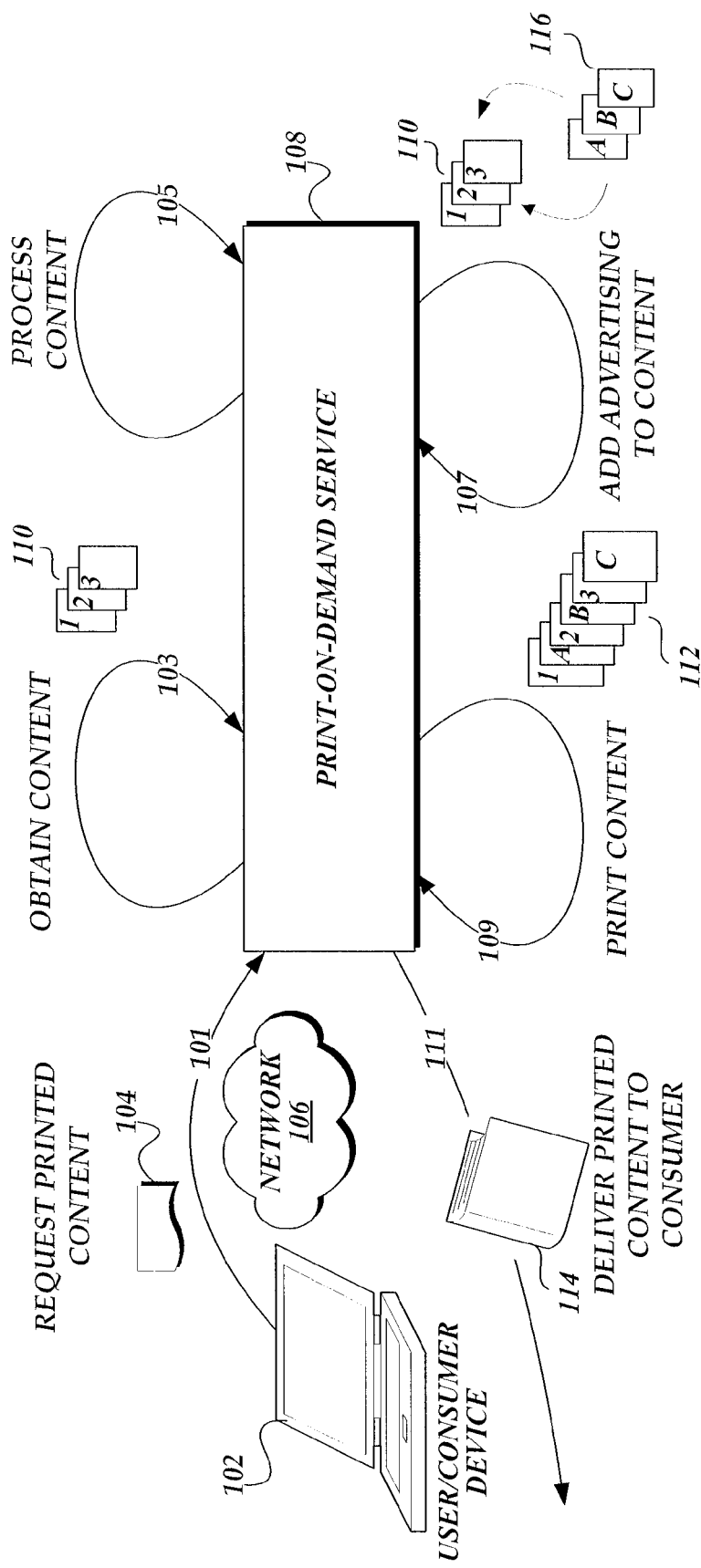
FIG. 1 is a pictorial diagram illustrating aspects of an on-demand printing process that incorporates advertising into the printed document.

Turning to FIG. 1, a pictorial diagram 100 is shown illustrating aspects of an on-demand printing process that incorporates advertising into the on-demand printed content. The process beings with a request 104 from a consumer for printed content. The request 104 from a consumer may indicate/identify the content to be printed, such as an out-of-print book, available either locally or available to the print-on-demand service 108 from other sources. Alternatively, the request may include the content to be printed, such as a document in the form of a computer file in a suitable format, such as PDF (Portable Data Format). A request may be accompanied with a printed copy of the content to be printed.

The request 104 may be initiated by a consumer (not illustrated) at a consumer computer 102 with a print-on-demand service 108 over a network 106, as illustrated by arrow 101. Alternatively, the request 104 may be made by other means than by a computer 102. Thus, the process demonstrated in FIG. 1 should be viewed as illustrative and not construed as limiting upon the disclosed subject matter. Regarding the consumer, a "consumer" is a general reference to any number of particular entities, including authors, individuals, content vendors, and the like. While there are any number of entities that may request on-demand printed content, for simplicity in description, they will be generally referred to as a consumer.

For its part, upon receipt of the request 104 for on-demand printed content, the print-on-demand service 108 obtains a computer-readable digital image 110 of the requested content for on-demand printing, as illustrated by arrow 103. The computer-readable digital image 110 of the requested content comprises one or more page images, each page image corresponding to a page of printed content. Digital images, such as digital image 110, may be obtained in any number of formats including raster based images, vector based images, hybrid raster/vector based images, and the like. Obtaining a digital image 110 of the requested content may be accomplished in a variety of manners. For example (not shown), the requested content may correspond to a printed document available to the print-on-demand service 108 which is processed by a scanner or scanning service associated with the print-on-demand service into a digital image 110. Alternatively, the requested content may be supplied by the consumer as a digital image 110 with the request 104, or already available within a content store included with or communicatively available to the print-on-demand service 108. Indeed, those skilled in the art will appreciate that there are numerous sources for obtaining a digital image 110 of requested content, each of which is contemplated as falling within the scope of the disclosed subject matter.

In regard to the requested content, it should be appreciated that the requested content may comprise a plurality of discrete printed documents or other content. For example, the requested content may specify a set of books that were published separately, but that are to be included in a print-on-demand compilation of the set. Accordingly, while the requested content will be referred to in the singular, it is for the sake of simplicity in describing the disclosed subject matter, and should not be construed as limiting upon the disclosed subject matter.

After obtaining a digital image 110 of the requested content, the requested content (in particular, the digital image 110 of the requested content) is optionally processed in order to improve the clarity of digital image and, correspondingly, to improve the on-demand printed instance of the requested content, as indicated by arrow 105. Various suitable examples of processing a digital image 110 of content are more fully explored in co-pending patent applications, including U.S. patent application Ser. No. 11/864,208, filed Sep. 28, 2007, entitled "Processing a Digital Image of Content," U.S. patent application Ser. No. 11/864,187, filed Sep. 28, 2007, entitled "Processing a Digital Image of Content Using Content Aware Despeckling," and U.S. patent application Ser. No. 11/864,180, filed Sep. 28, 2007, entitled "Processing a Digital Image of Content to Remove Border Artifacts," each of which is incorporated herein by reference.

After processing the digital image 110 for print-readiness (if necessary), the print-on-demand service 108 selectively adds advertisements 116 to the digital image 110, as indicated by arrow 107. Adding one or more advertisements 116 (or other supplemental content) to a digital image 110 of requested content is described in greater detail below.

Once advertisements 116 have been added to the digital image (as now shown as digital image 112), the print-on-demand service 108 causes the digital image 112 to be printed, as indicated by arrow 109. Printing the digital image 112 may be carried out by the print-on-demand service 108, or alternatively printed by a service available to the print-on-demand service. Printing content in an on-demand manner is known in the art. After printing the requested content, the on-demand printed content 114 is delivered to the consumer.

Figure 2:
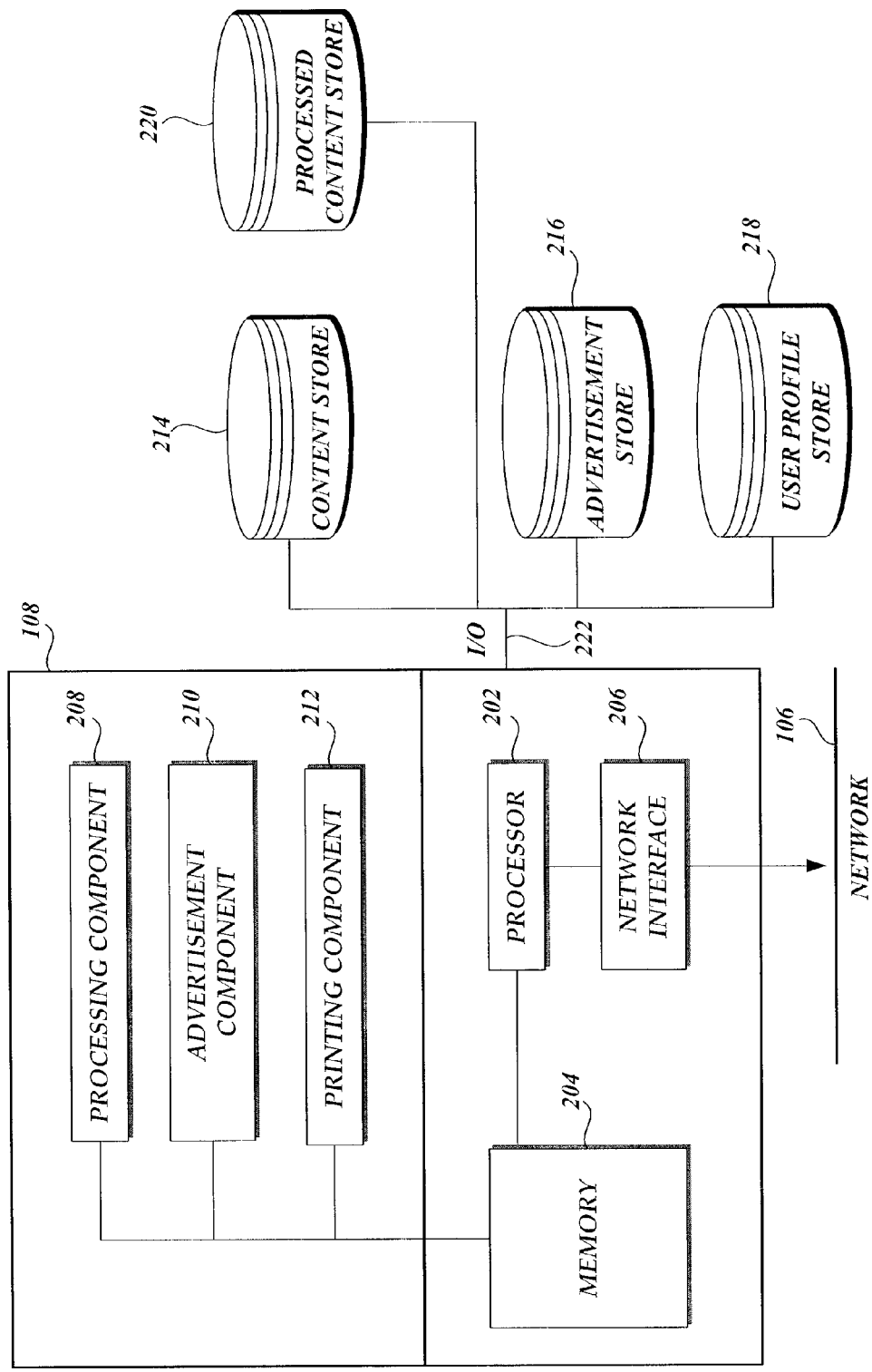
FIG. 2 is a pictorial diagram of an illustrative print-on-demand service suitably configured to incorporate advertising within an on-demand printed document in accordance with aspects of the disclosed subject matter.

With regard to the print-on-demand service 108, FIG. 2 is a pictorial diagram of a print-on-demand service 108 illustratively implemented on a computing device and configured to incorporate one or more advertisements within an on-demand printed document in response to a request for the printed content. As shown in FIG. 2, the print-on-demand service 108 includes a processor 202 to execute computer-executable instructions to carry out the various functions of the print-on-demand service, and a memory 204 that stores computer-executable instructions and data. The memory comprises any number of combinations of volatile and/or non-volatile memory including, but not limited to, random-access memory (RAM), read-only memory (ROM), flash memory, and the like, and is generally used to hold executable code, such as software application programs, and data. It should be further appreciated that there are a variety of computing devices that may be configured as the on print-on-demand service 108, including but not limited, to personal computers, mini- and/or mainframe computers, laptop computers, and the like.

Those skilled in the art will appreciate that an exemplary print-on-demand service 108 may be suitably implemented on multiple cooperative computing devices interconnected via a network 106 including both local area networks (LANs) and wide area networks (WANs). Accordingly, while the following discussion will be made as though the print-on-demand service 108 is implemented on a single computing device, this is for ease of description only and should not be viewed as limiting upon the disclosed subject matter.

The print-on-demand service 108 also typically includes a network interface 206 that provides connectivity to the print-on-demand service with external network resources, including external digital image sources, scanners and/or scanning services, and/or consumer devices over a network 106. Those skilled in the art will appreciate that the print-on-demand service 108 also typically includes a number of additional components, such as, but not limited to, scanners, input/output devices, printing facilities, and the like that are common to a suitable computing system, though not described with particularity herein.

The print-on-demand service 108 may also include logical components, generally implemented as software modules and loaded onto memory 204, such as a processing component 208 that processes an obtained digital image 110 for print-on-demand readiness, an advertisement component 210 that selectively adds advertisements (or other supplemental content) to a digital image 110, and a printing component 212 that prints (or causes to be printed) an updated digital image 112, or generates an e-book, that includes one or more advertisements in an on-demand manner. In regard to these components, as mentioned above these various components are logical components and, therefore, not necessarily actual and/or discrete components. Indeed, one or any of the logical components may be combined together or with other logical and/or actual components, including components not discussed herein. Moreover, these various components of the print-on-demand service 108 may be implemented in hardware, in software, or a combination thereof.

The print-on-demand service 108 is further illustrated in FIG. 2 as including a content store 214, a processed content store 220, an advertisement store 216, and a user profile store 218. The content store 214 stores digital images of content and, in various embodiments, may include processed digital images of content, and may further include processed digital images of content into which advertisements have been incorporated. As will be appreciated by those skilled in the art, storing processed digital images may be desirable for efficiency purposes. In one illustrative embodiment, as noted above, the content store 214 includes both un-processed digital images of content as well as processed digital images of content. In another illustrative embodiment, the un-processed digital images are stored in content store 214 while the processed digital images are stored in processed content store 220. As indicated above, many types of processing may be performed on digital images resulting in processed digital images suitable for on-demand printing.

The content store 214 and/or processed content store 220 may include metadata in addition to the digital images. The metadata generally contain information describing the associated data, in this case, the digital images. The metadata may include information such as size of the digital images, file formats, encoding information, subject matter information, relationship to other digital images, such as page numbers in a sequence of digital images, and the like. Those skilled in the art will appreciate that metadata may include any kind of information that the author or owner of the digital images may wish to associate with the digital images. Any kind of data, including advertisement data, may be associated with metadata as more fully described below.

In one illustrative embodiment, the illustrated data stores, including the content store 214, the processed content store 220, the advertisement store 216, and the user profile store 218, are typically coupled with the computer system implementing print-on-demand service 108 via an input/output (I/O) bus 222. In alternative embodiments, any or all of the content stores may be remotely located with respect to the print-on-demand service 108. Those skilled in the art will appreciate that peripheral devices, such as the data stores discussed above, may be locally or remotely coupled to a computer system in many ways including many types of I/O interfaces, such as IDE (Integrated Drive Electronics), SCSI (Small Computer System Interface), USB (Universal Serial Bus), and networked I/O for remote data stores.

The advertisement store 216 stores advertisements to be included in an on-demand printed instance of requested content. Of course, advertisements (or other supplemental content) may be obtained from, in place of or in addition to, an external source over a network. Accordingly, the disclosed subject matter should not be construed as limited to obtaining advertisements and/or other content from a local advertisement store 216. As noted above, the advertisement store 216 may additionally include metadata for storing information about the advertisements, as distinct from the content of the advertisements. For example, the metadata may include information such as size of the advertisement, type of the advertisement, relevance, related content, cost, and other information and parameters that may be useful in selecting and including advertisements in an on-demand printed document.

As mentioned, the metadata may include information related to the requested content. For example, the metadata may include subject matter information, such as sports-related subjects, that may be related to the subject matter of the requested content. Using such subject-related information in the metadata, the advertisements associated with the metadata may in turn be associated with the requested content having a similar subject matter. Those skilled in the art will appreciate that metadata may be stored in many formats and associated with the data that the metadata describes in many different manners. For example, the metadata may be stored in a file header containing the advertisement, a separate table associated with the advertisement, or even in a separate file associated with the advertisement file. Digital image metadata, typically stored in the content stores 214 and 220, and the advertisement metadata, typically stored in the advertisement store 216, may be used in conjunction with each other to select advertisement suitable for use with the digital images. For example, both sets of metadata may include subject matter information, such as sports or history, that could be used to associate appropriate advertisements with the digital images of the content.

The user profile store 218 optionally includes profile information. More particularly, user profile information advantageously identifies various aspects related to a user, such as interests, hobbies, currently owned and/or purchased items, and the like, that may be used in selecting advertisements for inclusion in an on-demand instance of requested content.

As noted above, the print-on-demand service 108 may include advertisements and/or other related content in a printed instance of requested content according to aspects of the disclosed subject matter. Including advertising and/or related content with on-demand printed content may prove advantageous to a consumer. For example, a lower price may be offered to a consumer regarding a request for on-demand printed content if the consumer is willing to accept advertising in the printed content 114. Additionally, a consumer may benefit from content-related information that is not part of the requested content, such as supplemental reference material, relevant footnotes, illustrations, and the like. Content-related information, as well as advertisements may be included in the form of appendixes or in-line with the requested printed content.

In adding advertisements 116 to the requested content, according to one embodiment, the advertisement component 210 accesses metadata (not shown) associated with the advertisement to select and/or ascertain which advertisements (or related content) to include in the requested printed content 114. The advertising metadata is typically stored with the advertisements in the advertisements store 216. However, the advertisement metadata may alternatively be stored separately. By way of illustration and example, advertisement metadata may be stored in an XML (Extensible Markup Language) data file storing information that may be advantageously used in determining the appropriateness of an advertisement for inclusion in requested content. The advertisement metadata may include the type of advertisement, information for placing advertisements in a digital image 110, and the like.

Regarding the location or placement of advertisements in requested content, there are many places where advertisement pages may be inserted with regard to the original requested content. For example and not by way of limitation, advertisements may be placed at the beginning of the requested printed content, at the end of the content, periodically throughout the content (such as every ten pages), at the beginning or end of chapters and/or other sections of the content, and the like.

In one embodiment, the advertisement component 210 parses the advertisement metadata and retrieves advertisements 116 from the advertisement store 216. In one illustrative embodiment, advertisements 116 are digital images suitable for on-demand printing. In another illustrative embodiment, the advertisements 116 may be stored in a different format in the advertisement store 216 and be converted to a printable image by the advertisement component 210 or other processing components within the print-on-demand service 108 on an as-needed basis. In one embodiment, the advertisement component 210 obtains the digital image 110 retrieved from content store 214, selects advertisements from the advertisement store 216, and combines the advertisement images 116 in the digital image 110 to create the modified digital image 112 that is suitable for on-demand printing.

The metadata may include information about the advertisements other than the placement of the advertisements within the sequence of page images. The metadata may include information regarding the nature, or subject matter, of the advertisements such that they can be correlated to the requested content. For example, the metadata may indicate which particular advertisements from the advertisement store 216 are to be used based on the subject matter of the requested content. For instance, if the requested content includes a novel taking place in Europe, the advertisements may include information about European hotels, resorts, etc.

The advertisements 116 from the advertisement store 216 may also include information of general interest to the customer ordering the requested content. The metadata may include information about advertisements 116 or other content based on user profile information obtained from the user profile store 218. The advertisement component 210 may select advertisements based on user profile information indicated by the metadata as being relevant to the requested printed content 114. For example, if the customer has a history of interest in travel as indicated by the associated user profile, the advertisement component 210 may include, in the printed content 114, advertisements related to travel, even though such advertisement may not be directly relevant to the requested content. Additionally, the advertisements may be selected contextually based on the requested content. For example, an advertisement page image 116 may be inserted in a location within the requested printed content 114 where the content of the advertisement is closely related to the requested content in the page before or after the advertisement page image 116. For instance, if a restaurant is described on page 12 of the requested printed content 114, the advertisement page image 116 next to page 12, i.e., either on page 11 or page 13, may include advertisements about restaurants, wine, food, etc., which are related to restaurants and dining.

Figure 3A:
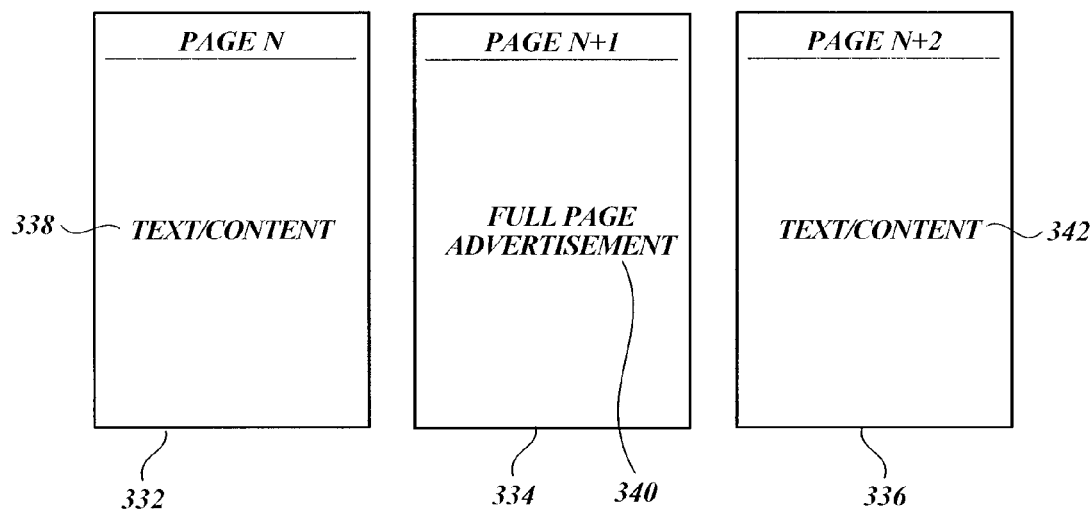
FIG. 3A is a pictorial diagram of an illustrative sequence of page images including an advertisement page image.

As noted above, advertisements may be included in the requested printed content 114 as full-page advertisements dedicated only to advertising with no requested content appearing thereon. FIG. 3A is a pictorial diagram of an illustrative sequence of page images including an advertisement page image. In this configuration, a full-page of advertisements 334 including one or more advertisements 340 appears in an independent page N+1 next to pages 332 and 336 containing requested content 338 and 342, respectively. The advertisement page 334 generally includes no requested content 338 or 342 and is dedicated to advertisement content 340. Such advertisement pages 334 may appear in groups or individually at different page locations within the requested printed content 114 and each such advertisement page 334 may include an advertisement 340. Those skilled in the art will appreciate that although not illustrated in FIG. 3A, multiple advertisements may be placed on the advertisement page 334. As noted above, such advertisement pages 334 may appear at the beginning of the requested printed content 114, at the beginning of chapters, at the end of the publication, periodically throughout the content, and the like. Those skilled in the art will appreciate that such full-page dedicated advertisement pages 334 may be placed within the requested printed content 114 according to many parameters, considerations, and algorithms. For example, advertisement pages 334 may be concentrated toward the beginning of the requested printed content 114 dispersed equally throughout the publication, or concentrated toward the end of the publication.

The advertisement 340 may include information useful for obtaining further information about the product/services being advertised by the advertisement 340. The advertisement information may illustratively include an advertising token or code that the client may enter via a computer terminal at a Web site to get further information and/or promotions associated with the advertisement 340. For example, the token may be in the form of a human-readable number or encoded characters, such as a barcode, that may be used to get additional discounts on a product and/or service advertised by the advertisement 340. The advertising tokens and the like may be used as evidence of user interest in the advertisement 340, and the basis for creating a record of success for charging advertisers. Thus, advertising information, such as tokens, may be used to track the effectiveness of a particular advertisement. As those skilled in the art will appreciate, generally speaking, the more the token is entered into the Web site UI, the more successful the advertisement 340, and the more the advertiser providing the advertisement 340 may be charged. The advertising information may further be used to track user interests and further build user profile, for example, by adding to or updating data in the user profile store 218.

Figure 3B:
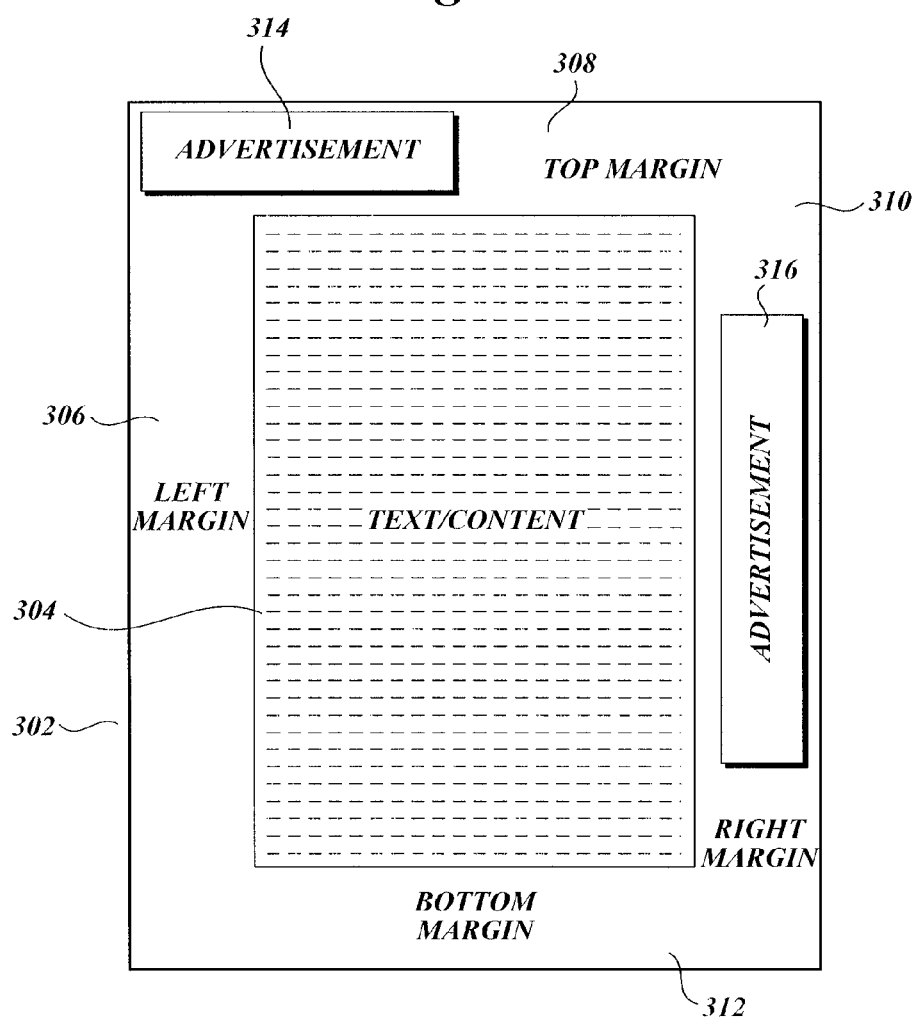
FIG. 3B is a pictorial diagram of an illustrative page image including margins suitable for printing advertisement and other content.

The placement of advertisements is not necessarily limited to dedicated advertisement pages 334 placed among requested content pages 332 and 336. Any writable space in the requested printed content 114 may be used for placing advertisements of various forms and configurations. FIG. 3B is a pictorial diagram of an illustrative page image of content including margins suitable for printing advertisements and other related information. As illustrated in FIG. 3B, a typical publication page has four margins including a top margin 308, a bottom margin 312, a left margin 306, and a right margin 310. Margins of the page 302 surround the content 304 of the page. Those skilled in the art will appreciate that although almost all publications, such as books, magazines, etc., have a rectangular shape, other publication shapes are possible. For example, a publication may be in the form of a circle or other irregular shapes, such as the shape of a horse, for example, for a children's book. Books with irregular shapes also have margins which are defined as a blank space surrounding the content of the page, whatever the shape of the page might be. Accordingly, references made to top, bottom, left, and right margins herein are equally applicable to content of nonrectangular shapes. Metadata parsed by the advertisement component 210 may generally indicate where on the margins of a page image to place advertisements. For example, the metadata may indicate that a particular advertisement 314 be placed on the top margin 308 of a requested content page image 302. Similarly, an advertisement 316 may be placed in the right margin 310 of the requested content page image 302. To place advertisements on margins of a requested content page 302, the advertisement content must first be included in the requested content page image 302 to create a requested page image having advertisement content rendered thereon.

According to aspects of the disclosed subject matter, the space within the margins available for advertising may be modified to accommodate advertisements, including those that might not otherwise fit on a particular printed page. One way for modifying the margins includes scaling the requested content page image 110 to create wider margins. Of course, numerous means for modifying the margins of a page may be implemented when it is desirable to place advertising in the margins.

In addition to advertisements, other information or content may be included in the requested printed content 114 related to the requested content. Text in many written materials, historical books, reports, magazine articles, etc., refer to other publications or content not directly included in such written material. It may be desirable for the customer to have such reference material referenced in the requested content to be included in the requested printed content 114, for example, in the form of an appendix. For example, if the customer requests content including historical events, such as an out-of-print history book, the customer may desire to have all or some of the external material referenced in the requested content included in the requested printed content 114. Such additional referenced content may be included in the requested printed content 114 as appendices, footnotes on appropriate pages, or additional pages dispersed appropriately throughout the requested printed content 114.

In addition to advertisements and reference material, other related content may be included with the requested content in the requested printed content 114. Such other content may include background information related to the requested content, recommendations for other products, books, or services, related to the requested content or based on the user profile, or any other extra content somehow related to the requested content or user profile. For example, if the customer requests content about ship building, other content about the history of ship building may be added to the requested content for inclusion in the requested printed content 114.

As with full-page advertisements 334, advertisements 314 and 316 placed on margins of the requested content page image 302 may include advertising tokens as discussed above with respect to FIG. 3A.

Figure 4:
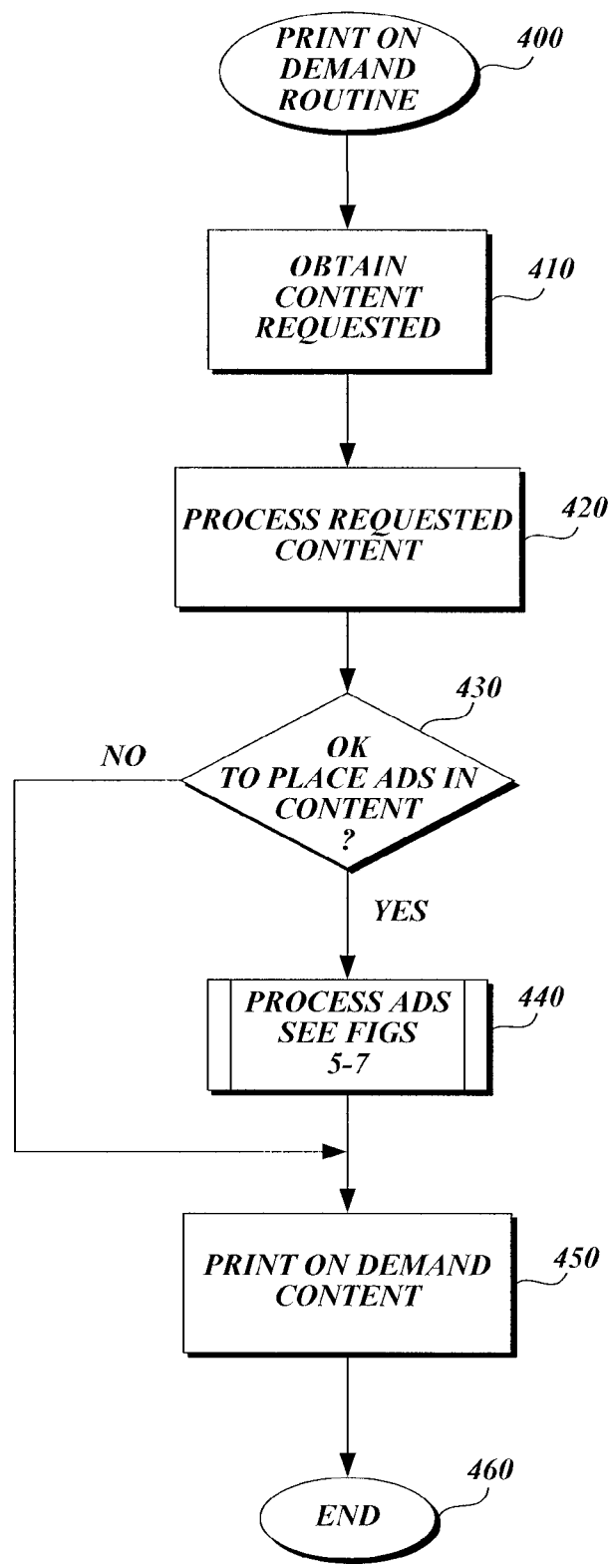
FIG. 4 is a flow diagram of an illustrative method of printing print-on-demand content including advertisement.

Turning now to illustrative methods for incorporating advertisements in requested content, FIG. 4 is a flow diagram of an illustrative method of printing on-demand printed content including one or more advertisements. The print-on-demand routine 400 continues to block 410 where on-demand content is obtained by the print-on-demand service 108. With reference to FIGS. 1, 2, and 4, and as discussed above, a digital image 110 of the requested content may be obtained from many sources including the content store 214 or external sources, such as third parties or scanning facilities that provide page images of requested content from existing printed samples of the same content, such as existing copies of old books and publications. If a digital image 110 of the requested content is not available, the digital image 110 may be created dynamically, for example, by scanning, and integrated to create the requested printed content 114.

At block 420, the page images 110 are processed by the processing component 208. As discussed above, many kinds of processing may be performed on the page images 110 to prepare the page images 110 for automated printing, improve visual quality, sort, change scale, etc. At block 430, authorization by the customer for placement of advertisements in the requested printed content 114 is verified. In one illustrative embodiment, at the time that the customer requests the printing of the printed content 114, the print-on-demand service 108 asks the customer whether the customer is willing to receive the printed content 114 having advertisements included therein for a lower charge than customer would pay for the printed content 114 without advertisements. Additionally (not shown), the print-on-demand service 108 may ask the customer whether the customer wants to have additional non-advertisement content, such as reference material, or other information related to the requested content such as background information, be included in the requested printed content 114 for an additional charge. If the permission to add additional content to the requested printed content 114 is verified, the routine proceeds to block 440 where the additional information is added to the requested printed content 114, as more fully described with respect to FIGS. 5-7 below. The additional content, including advertisements, references, recommendations, etc., may be predetermined and pre-stored in the advertisement and content data stores 214 and 216, respectively, or may be obtained dynamically from a third party, such as an advertiser, or a third party advertising service provider. For example, information about the requested content, obtained from content metadata, may be provided to the third party during the print-on-demand service 108 processing step 105 to obtain suitable advertisements 116. The routine 400 then proceeds to block 450 where the requested content is printed by the printing component 212. In the case of an e-book, more fully described below with reference to FIGS. 2 and 8, the printing component 212 generates the e-book at block 450. Those skilled in the art will appreciate that the e-book may be generated by a separate component (not shown) distinct from the printing component 212. Back at decision block 430, if the authorization by client to add additional content is not verified, the routine proceeds to block 450 for printing the requested content. The routine 400 terminates at block 460.

Figure 5:
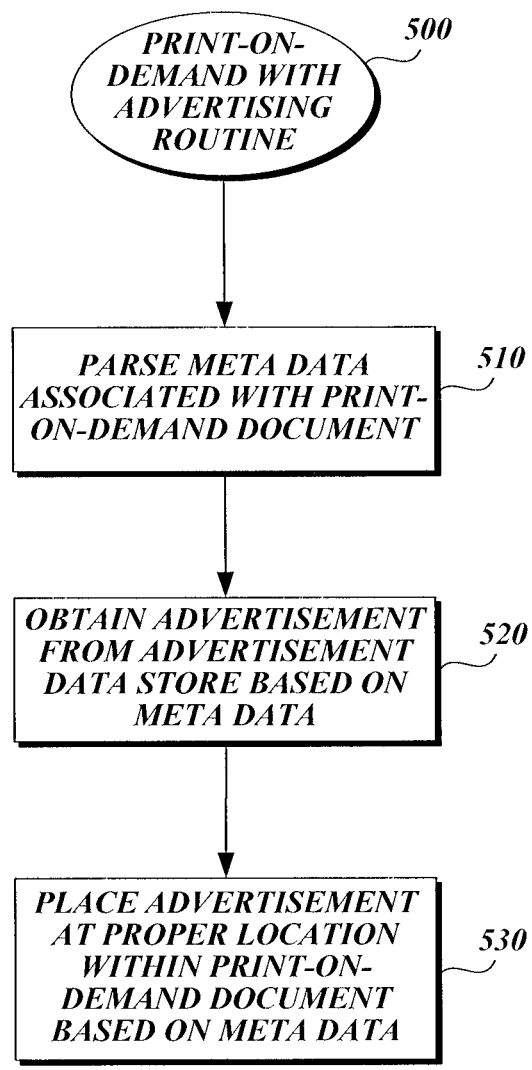
FIG. 5 is a flow diagram of an illustrative method of placing advertisement in print-on-demand content.

As described above, the requested printed content 114 may be created based on the requested content as well as advertisements related to the requested content. FIG. 5 is a flow diagram of an illustrative method of placing advertisements in a print-on-demand document, particularly in regard to placing advertisements in a print-on-demand document where the advertisements are selected and/or located in the requested content according to the subject matter of the content.

The routine 500 proceeds to block 510 where metadata may be consulted as to what advertisements are to be included in the requested printed content 114. With reference to FIG. 1, the metadata may include information about the type of advertisement and placement of advertisement in the requested printed content 114. The metadata may be included in a data file with a particular format such as XML. As also described above, the metadata provides information about the type and placement of advertisements, the type and placement of other content such as reference material, and type and placement of a recommendation for related products and services, such as related books. Generally, the advertisement component 210 retrieves metadata from the advertisement store 216 to parse and obtain information about other content to be included in the requested printed content 114 along with the requested content. The parsed metadata may indicate which advertisements to retrieve from the advertisement store 216 and where to place the advertisements within the final sequence of page images 112 before printing. At block 520, the advertisement component 210 obtains advertisements and/or other content from the advertisement store 216 or other data store, respectively. The advertisement component 210 creates appropriate page images including both the requested content and the advertisement or other content to be integrated according to the information obtained from the metadata. The other content may be incorporated into the final digital image 112 as separate page images inserted between requested content page images or as other content integrated with the requested page images, for example, as other content on margins of the requested page images.

At block 530, the advertisements are placed at the proper location within the requested printed content 114 based on the parsed metadata. Those skilled in the art will appreciate that placement of advertisements in different available locations within the margins of requested content page images, or on independent page images, may be optimized such that the number of advertisements are maximized. That is, advertisements or other content may be placed in such size, orientation, and font as to maximize the number of additional information and, at the same time, minimize the amount of space required to include such other content in the requested printed content 114. Additionally, different print locations within the requested printed content 114 and also within an individual page may have different values and different levels of desirability. Like real estate, printing space in some areas of a document may have more commercial value for advertisers than other places in the document. For example, an advertisement placed at the beginning of a chapter may be more visible to the reader of the book than advertisement placed in a page at the back of the book. Similarly, advertisements placed on top or bottom margins may be more visible and readable than advertisements placed on the left or right margins of a page image. Accordingly, different prices may be associated with different places in which advertisement or other content may appear. Another type of page image that may be included in the requested printed content 114 is a foldout insert suitable for placing advertisements with larger and more prominent size and having a different type of paper to be more visible and accessible by a reader of the book.

Figure 6:
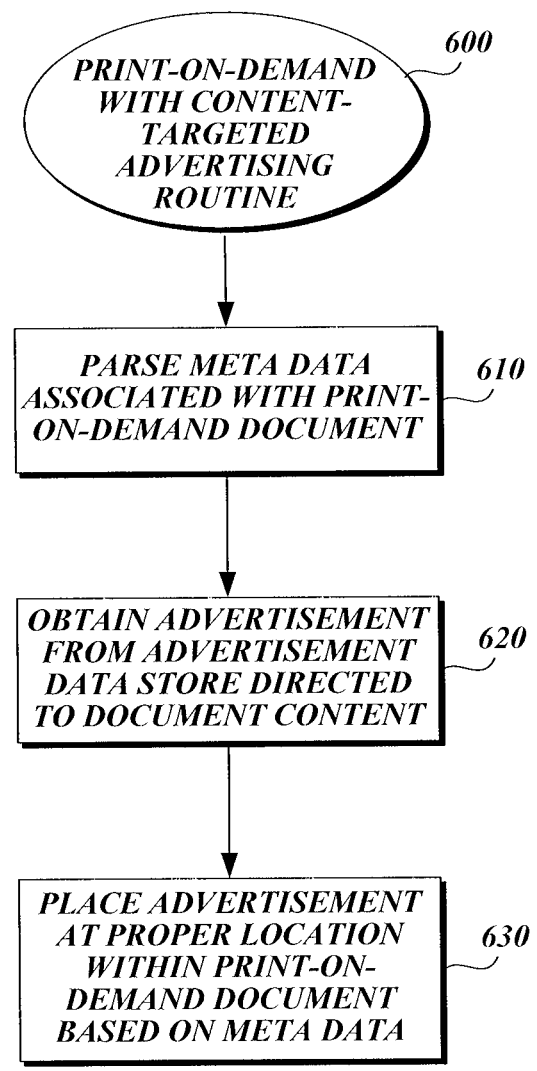
FIG. 6 is a flow diagram of an illustrative method of placing content-targeted advertisement in a print-on-demand document.

As described above, the advertisements or other content may be associated with the subject matter of the requested content. FIG. 6 is a flow diagram of an illustrative method of placing content-targeted advertisements in a print-on-demand document. The print-on-demand with content-targeted advertising routine proceeds to block 610 where metadata is parsed by the advertisement component 210. The metadata parsed by the advertisement component 210 may include information about the subject matter of the requested content and advertisements or other content, such as reference material, closely associated with the subject matter of the requested content. The advertisement component 210 obtains advertisements from the advertisement store 216 based on the parsed metadata at block 620. At block 630, the retrieved advertisement is placed at an appropriate location, either in an independent page image or on the margins of the requested content page image based on the information obtained from the parsed metadata by the advertisement component 210. For example, if a paragraph within a requested content page image describes a sports competition, the content manager may place a sports equipment advertisement, such as an advertisement for a sports shoe, on the left or right margin closest to the paragraph describing the sports event.

Figure 7:
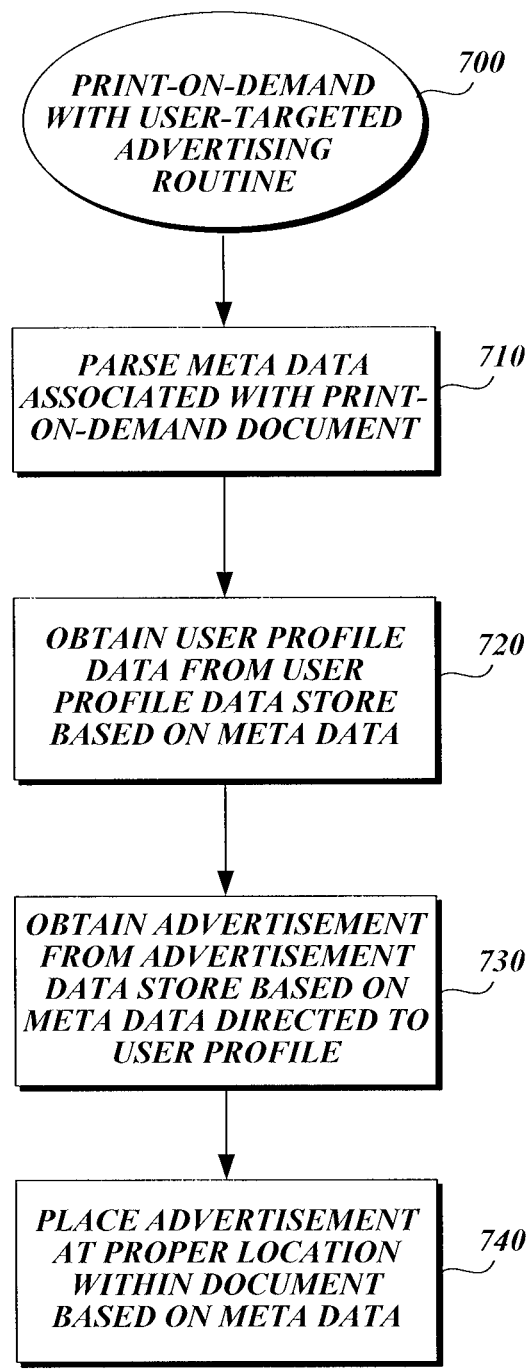
FIG. 7 is a flow diagram of an illustrative method of placing user-targeted advertisement in a print-on-demand document.

The advertisement or other content may also be selected based on user-targeted criteria. FIG. 7 is a flow diagram of an illustrative method of placing user-targeted advertisements in a print-on-demand document. The print-on-demand with user-targeted advertising routine proceeds to block 710 where metadata obtained from the metadata data store 130 is parsed by advertisement component 210. With reference also to FIGS. 1 and 2 now, at block 720, the advertisement component 210 also retrieves user profile information from the user profile store 218, associated with the client. At block 730, the advertisement component 210 selects advertisements or other content from advertisement store 216 or other data store (not shown), respectively, based on information obtained from the user profile and the parsed metadata. At block 740, the advertisement is placed at a proper location within the requested printed content 114 based on the user profile and the metadata. Those skilled in the art will appreciate that user-targeted and content-targeted advertising or other content may be placed in the requested printed content 114 in combination or individually. User-targeted advertising may be based on the history of requests from client or other user profile information such as age and demographics.

Those skilled in the art will appreciate that there are many types of other content that may be included with the requested content, some of which were described above. For example, the other content could include special dedications included on a requested content page image 122 or on a separate dedication page at the beginning of the requested printed content 114. Another example of other content is a signature page printed with a dedication, such as an autograph by the author of the book on an autograph page or integrated with one of the requested content page images 110 at the beginning of the book. Other types of customizations may also be done aside from the requested content ordered by the client. For example, the color or type of pages may be specified either independent of or according to the requested content by the client. For example, the client may specify special stationery paper for a particular type of content. For instance, if the requested content is about historical subjects, the client may indicate that a type and color of paper be used with an antique look and feel. Additionally, the cover of the requested printed content 114 may be selected by the client. For example, the client may request that a special picture or image be printed on the cover of the book to further personalize or customize the requested printed content 114. The client may select a series of books to be printed on demand as personalized special editions.

The process described above is generally directed towards incorporating advertisements into on-demand printed content in contrast to outputting the requested content with advertisements in digital form. However, the foregoing descriptions and discussions of the print-on-demand service 108 are equally applicable to generating on-demand content with advertisements in other media/forms, such as generating on-demand electronic books or "e-books" that include advertisements. Electronic books can provide the same content as printed content. Therefore, the requested content may be delivered to the client in the form of printed paper or as digital content, such as an e-book, for reading using an e-book reader.

Figure 8:
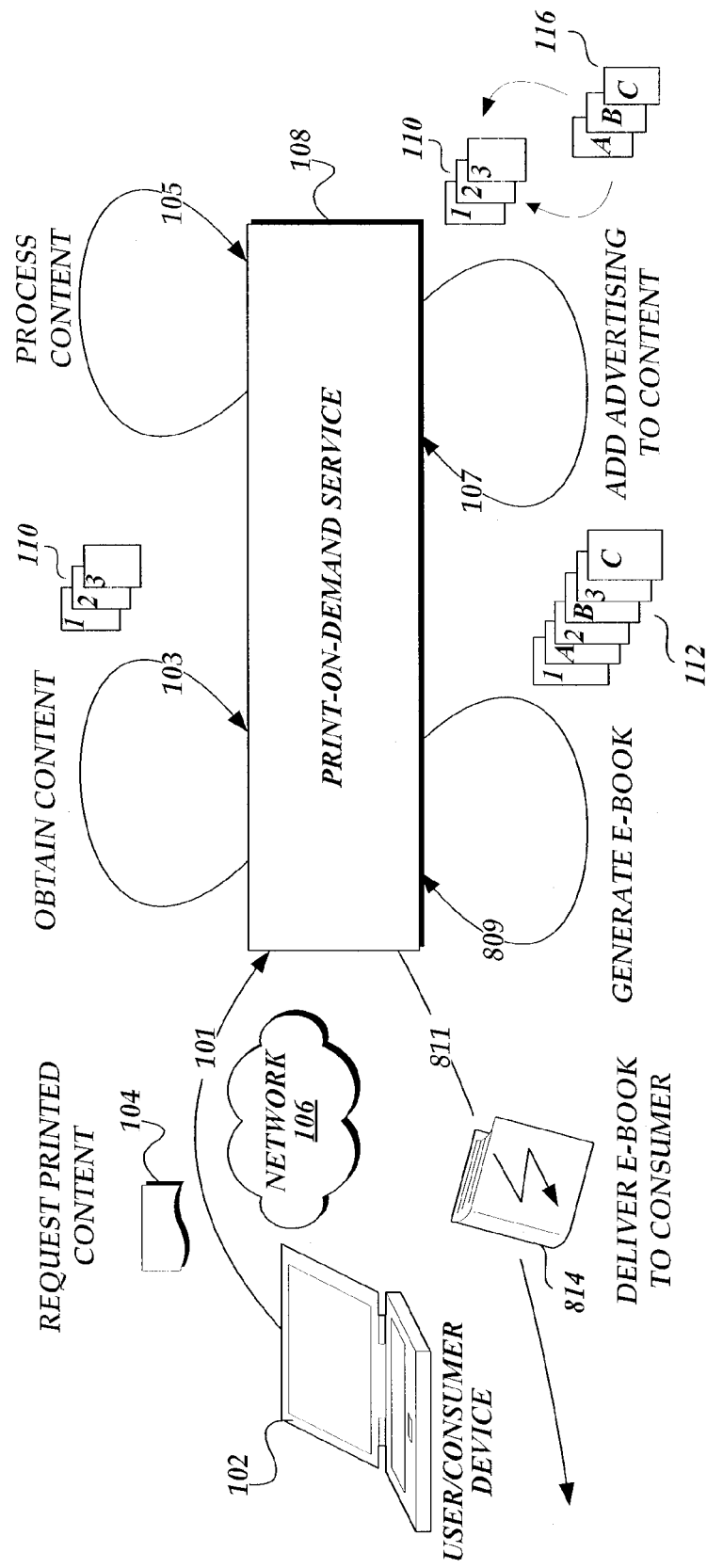
FIG. 8 is a pictorial diagram of an illustrative print-on-demand service suitably configured to incorporate advertising within an on-demand e-book in accordance with aspects of the disclosed subject matter.

E-books may be read on a variety of electronic devices, such as personal computers, PDAs (personal digital assistant), or dedicated electronic e-book reader devices. As noted above, generally, e-books have fixed content. That is, the content presented on e-book readers is typically predetermined and cannot be changed dynamically by a user, like content on Web pages. As such, the process described above with respect to generating on-demand printed content is equally applicable to generating e-book content. Specifically, when the content of the e-books is created, fixed advertising or other fixed content may be added to the requested content using the same means and processes described above. With reference to FIGS. 1, 2, and 8, the some of the differences between generating on-demand printed content and on-demand fixed electronic content, i.e., e-books, are in the final steps, depicted by arrows 809 and 811, where instead of a paper-printed content 114, a digital representation of the requested content with advertisements, i.e., an e-book 814, is generated in step 809 by the printing component 212 and delivered to the client in step 811. All other steps for the creation of digital content 112 remain substantially the same.

Due to the nature of e-books and e-book readers, certain other capabilities are available to the client which are absent from printed content. Such other capabilities are related to the processing and communication capabilities of e-book readers. A client may use the local processing power and memory of an the e-book reader or use wireless and/or other networking technologies to access further information related to the requested content and/or the other content, such as advertisements, included therein. For example, with reference to FIGS. 3A and 3B, an advertisement 340, 314, or 316 may be in the form of one or a few descriptive advertising words, pictures, or symbols, indicating that further information may be obtained by selecting such advertising words, pictures, or symbols. On selection, expanded information may be presented to the client.

However, in contrast to content presented by Web site hosts, once the requested fixed electronic content 814 is generated, the advertisements 340, 314, or 316 themselves are fixed on the requested content page images 302 or advertisement page image 334. Those skilled in the art will appreciate that the presentation of the expanded information may take many forms. In one illustrative embodiment, a "mouse-over" move on the advertising words, pictures, or symbols may open a dialog-type window to present the expanded information. In another illustrative embodiment, the selection, for example by a mouse click, of the advertising words, pictures, or symbols, may cause another window to open or a web browser application program to be launched to present the expanded information. In yet another illustrative embodiment, the expanded information may be presented using a combination of the methods described above, depending on, for example, the size and complexity of the expanded information. If the expanded information is limited to a few additional words or pictures, then a dialog-type window may be sufficient. However, if the expanded information includes a great deal of information, links, or images, then another window or a web browser application may be used to present such expanded information.

Similar to the advertisements 340, 314, and 316 discussed above with respect to printed content, advertisements placed on e-books may include advertising tokens. Such tokens are used substantially as described above with respect to the printed content.

While illustrative embodiments have been illustrated and described, it will be appreciated that various changes can be made therein without departing from the spirit and scope of the invention.

Therefore, the following is claimed:

1. A non-transitory computer-readable medium embodying a program executable in a computing device, wherein, when executed, the program causes the computing device to at least:
   receive, in response to receiving a request for content from a client device, a digital image corresponding to the content;
   select complementary content based at least in part on a correlation between first metadata associated with the complementary content and second metadata associated with the content;
   determine a location for including the complementary content in the digital image corresponding to the content based at least in part on determining a respective subject matter of a plurality of pages in the content of the digital image, the respective subject matter being determined based at least in part on the second metadata associated with the content;
   update the digital image by including the complementary content at the location;
   in response to updating the digital image, remotely control the generation of an electronic book by a service based at least in part on converting the digital image into an electronic book format; and
   send the electronic book to the client device automatically and without intervention.

2. The non-transitory computer-readable medium of claim 1, wherein determining the location to include the complementary content in the content further comprises determining a respective page of the plurality of pages to include the complementary content based at least in part on the first metadata associated with the complementary content.

3. The non-transitory computer-readable medium of claim 1, wherein the complementary content is at least one of reference material related to the content, a footnote associated with the content, an appendix, and a supplemental illustration corresponding to the content.

4. A system, comprising:
   at least one computing device, and
   at least one application executable in the at least one computing device, wherein, when executed, the at least one application causes the at least one computing device to at least:
   receive, in response to receiving a request for content from a client device, a digital image corresponding to the content;
   select complementary content based at least on a correlation between first metadata associated with the complementary content and second metadata associated with the content;
   determine a location for including the complementary content in the digital image corresponding to the content;
   update the digital image corresponding to the content by including the complementary content at the location;
   in response to updating the digital image, generate an electronic book based at least in part on converting the digital image into an electronic book format; and
   automatically send the electronic book to the client device.

5. The system of claim 4, wherein the at least one application further causes the at least one computing device to at least:
   select, in response to selecting the complementary content, additional content to place in the digital image corresponding to the content.

6. The system of claim 5, wherein the additional content is reference material associated with the content.

7. The system of claim 6, wherein the additional content includes a recommendation for a product, book, or service that is related to the content.

8. The system of claim 5, wherein the at least one application further causes the at least one computing device to at least transmit, over a network, the second metadata to a third party system and the additional content is received from the third party system.

9. The system of claim 4, wherein selecting complementary content further causes the at least one computing device to at least select the complementary content according to a first subject matter of the content such that the first subject matter of the content and a second subject matter of the complementary content are related.

10. The system of claim 4, wherein selecting complementary content further causes the at least one computing device to at least select the complementary content according to a user profile interest of a user of the client device.

11. The system of claim 10, wherein selecting the complementary content according to a user profile interest of a user of the client device further causes the at least one computing device to at least select the complementary content according to a user profile interest of a user of the client device and according to a first subject matter of the content such that the first subject matter of the content and a second subject matter of the complementary content and the user profile interest are related.

12. A method, comprising:
receiving, in at least one of one or more computing devices, a request for content from a client device;
receiving, via at least one of the one or more computing devices, a digital image corresponding to the content;
selecting, via at least one of the one or more computing devices, a customized content entry based at least on a correlation between first metadata associated with the customized content entry and second metadata associated with the content;
determining, via at least one of the one or more computing devices, a location for including the customized content entry in the digital image corresponding to the content;
updating, via at least one of the one or more computing devices, the digital image corresponding to the content by including the complementary content at the location;
in response to updating the digital image, remotely controlling, via at least one of the one or more computing devices, the generation of an electronic book by a service based at least in part on converting the digital image into an electronic book format; and
automatically sending, via at least one of the one or more computing devices, the electronic book to the client device.

13. The method of claim 12, wherein the customized content entry comprises an advertisement, the advertisement comprising actionable content for activating a related application on an electronic book viewing device displaying the content including the advertisement.

14. The method of claim 12, wherein the customized content entry comprises a signature page of an author.

15. The method of claim 12, wherein the customized content entry comprises a reference material associated with subject matter of the content.

16. The method of claim 12, wherein the customized content entry is included in an on-demand textual content, and wherein the on-demand textual content is included in a printed book.

17. The method of claim 12, wherein the correlation between the first metadata associated with the complementary content and the second metadata associated with the content is related to information for receiving further information about products or services referenced in the content.

18. The method of claim 17, wherein the information includes at least one token that a user enters via the client device to receive a promotion associated with the complementary content.

19. The method of claim 12, further comprising scaling, via at least one of the one or more computing devices, a portion of the digital image corresponding to the content to accommodate the inclusion of the complementary content, wherein scaling comprises reducing the portion of the digital image corresponding to the content to create at least one wider margin in a page of the digital image.

20. The method of claim 12, further comprising retrieving the first metadata associated with the complementary content and the second metadata associated with the content from an XML data file.

* * * * *